United States Patent
Lien et al.

(10) Patent No.: US 10,626,899 B2
(45) Date of Patent: Apr. 21, 2020

(54) CLAMPING FIXTURE

(71) Applicant: ABILITY ENTERPRISE CO., LTD., New Taipei (TW)

(72) Inventors: Hao-Chung Lien, New Taipei (TW); Chia-Wei Fu, New Taipei (TW); Hsien-Ming Lee, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 16/157,172

(22) Filed: Oct. 11, 2018

(65) Prior Publication Data
US 2019/0145444 A1    May 16, 2019

(30) Foreign Application Priority Data

Nov. 14, 2017 (TW) .............................. 106139347 A

(51) Int. Cl.
| | | |
|---|---|---|
| *F16B 2/02* | (2006.01) | |
| *F16B 2/12* | (2006.01) | |
| *F16B 2/10* | (2006.01) | |
| *H04M 1/11* | (2006.01) | |
| *H04M 1/04* | (2006.01) | |

(52) U.S. Cl.
CPC .................. *F16B 2/12* (2013.01); *F16B 2/02* (2013.01); *F16B 2/10* (2013.01); *H04M 1/04* (2013.01); *H04M 1/11* (2013.01)

(58) Field of Classification Search
CPC ...... F16B 2/12; F16B 2/10; F16B 2/18; F16B 2/185; F16M 2200/02; F16M 13/00; F16M 11/041; F16M 11/40; F16M 11/242; F16M 11/2021; H04M 1/04; H04M 1/11; Y10T 24/44299; Y10T 24/44581
USPC ......... 248/309.1, 316.1, 316.4, 316.2, 316.3, 248/316.5, 316.6, 316.8, 316.7
See application file for complete search history.

(56) References Cited

U.S. PATENT DOCUMENTS

| | | | | |
|---|---|---|---|---|
| 4,582,289 A | * | 4/1986 | Gibson .................. | B25B 1/103 248/316.4 |
| 6,085,113 A | * | 7/2000 | Fan ..................... | B60R 11/0241 379/426 |
| 7,540,459 B2 | * | 6/2009 | Asano ................. | B60R 11/0241 248/309.1 |
| 7,647,676 B2 | * | 1/2010 | Carnevali ................. | A45F 5/00 24/523 |
| 7,823,844 B2 | * | 11/2010 | Carnevali ................. | B25B 5/02 108/143 |
| 7,828,259 B2 | * | 11/2010 | Wang ..................... | B60R 11/02 248/316.4 |
| 8,074,951 B2 | * | 12/2011 | Carnevali ............... | B60R 11/02 108/143 |
| 9,103,487 B2 | * | 8/2015 | Hale .................... | G03B 17/566 |

(Continued)

*Primary Examiner* — Nkeisha Smith
(74) *Attorney, Agent, or Firm* — McClure, Qualey & Rodack, LLP

(57) ABSTRACT

A clamping fixture includes a body, a connector, a first clasp, at least one first elastic member and a lock. The connector is movable relative to the body along a first direction. The first clasp includes a first fastener and is disposed at one end of the connector. The at least one first elastic member is configured to apply force to the body and the connector along the first direction. The lock includes a second fastener. The first clasp and the lock are coupled through the first fastener and the second fastener.

19 Claims, 9 Drawing Sheets

(56) References Cited

U.S. PATENT DOCUMENTS

| | | | | |
|---|---|---|---|---|
| D744,473 S | * | 12/2015 | Tsai | D14/251 |
| 9,581,180 B2 | * | 2/2017 | Lien | F16B 2/10 |
| 9,586,530 B2 | * | 3/2017 | Kim | B60R 11/02 |
| 9,618,153 B2 | * | 4/2017 | Hale | G03B 17/566 |
| 9,924,005 B1 | * | 3/2018 | McElderry | H04M 1/04 |
| 10,098,452 B2 | * | 10/2018 | Ko | A47B 23/04 |
| 10,118,565 B2 | * | 11/2018 | Kim | B60R 11/02 |
| 10,126,635 B2 | * | 11/2018 | Hale | G03B 17/566 |
| 10,128,887 B2 | * | 11/2018 | Balmer | A45F 5/10 |
| 2006/0278788 A1 | * | 12/2006 | Fan | B60R 11/02 248/309.1 |
| 2010/0025555 A1 | * | 2/2010 | Shigio | A47G 29/083 248/284.1 |
| 2010/0096396 A1 | * | 4/2010 | Doig | B60N 3/102 220/737 |
| 2014/0042285 A1 | * | 2/2014 | Carnevali | B60R 11/02 248/316.4 |
| 2014/0097306 A1 | * | 4/2014 | Hale | G03B 17/566 248/122.1 |
| 2015/0049204 A1 | * | 2/2015 | Okabe | G03B 17/12 348/207.1 |
| 2015/0192155 A1 | * | 7/2015 | Chen | H04N 5/2251 348/376 |
| 2015/0359114 A1 | * | 12/2015 | Yang | F16M 11/041 248/161 |
| 2017/0350555 A1 | * | 12/2017 | Jertson | A63B 69/3632 |
| 2018/0266457 A1 | * | 9/2018 | Du | B60R 11/0241 |
| 2019/0003638 A1 | * | 1/2019 | Bertelle | G06F 1/1632 |
| 2019/0113058 A1 | * | 4/2019 | Wine | F16B 2/12 |

\* cited by examiner

CLAMPING FIXTURE

This application claims the benefit of Taiwan application Serial No. 106139347, filed Nov. 14, 2017, the invention of which is incorporated by reference herein in its entirety.

TECHNICAL FIELD

The invention relates in general to a clamping fixture, and more particularly to a clamping fixture for holding a mobile device.

BACKGROUND

With the development of the 3C (Computer, Communications and Consumer) industry, more and more people may use mobile devices as an aid in life. For example, common mobile devices include tablets, mobile phones, smart phones, etc. Due to the advantages of light weight and portability, more and more people use these mobile devices, and their functions are also getting wider.

As the mobile devices become more and more important in daily life, mobile devices are often used in conjunction with other expansion products. Therefore, a clamping fixture which is easy to carry is needed to firmly hold the mobile device.

SUMMARY

According to one embodiment of the present invention, a clamping fixture is provided. The clamping fixture includes a body, a connector, a first clasp, at least one first elastic member and a lock. The connector is movable relative to the body along a first direction. The first clasp has a first fastener. The first clasp is disposed on one end of the connector. The at least one first elastic member applies force to the body and the connector along the first direction. The lock has a second fastener. The first clasp and the lock are coupled through the first fastener and the second fastener.

According to another embodiment of the present invention, a clamping fixture is provided. The clamping fixture includes a body, a connector, at least one first elastic member and a first clasp. The connector is movable relative to the body along a first direction. The at least one first elastic member is disposed on the connector, and one end of the at least one first elastic member is pivotally connected to the body. The first clasp has a first fastener. The first clasp is disposed on one end of the connector. The first clasp is rotatable relative to the connector.

According to still another embodiment of the present invention, a clamping fixture is provided. The clamping fixture includes a body, a connector, a first clasp, at least one first elastic member, a second elastic member and a lock. The connector is movable relative to the body along a first direction. The first clasp has a first fastener. The lock has a second fastener. The first fastener and the second fastener are engageable with each other. Two ends of the at least one first elastic member are respectively connected to the body and the connector. Two ends of the second elastic member are respectively connected to the connector and the first clasp. When the first fastener is detached from the second fastener, the body and the connector are relatively movable along the first direction, and the first clasp is rotated towards a plane substantially perpendicular to the first direction by the second elastic member.

The present invention provides a clamping fixture which is light in weight, good in reliability and easy to operate. Once the user pushes the button on the body, the first clasp and the second clasp are automatically opened. After that, adjusting the distance between the first clasp and the second clasp may hold the mobile device between the first clasp and the second clasp.

BRIEF DESCRIPTION OF THE DRAWINGS

To make the above contents and other objects, features, advantages and embodiments of the present invention become more apparent and understood, detailed description of the drawings are as follows.

DETAILED DESCRIPTION

In the following detailed description, the spirit of the present invention will be apparent with the drawings. After an understanding of the preferred embodiments of the present invention, those skilled in the art can further change and modify the disclosed embodiments of the present invention without departing from the spirit and scope of the present invention.

Figure 1:
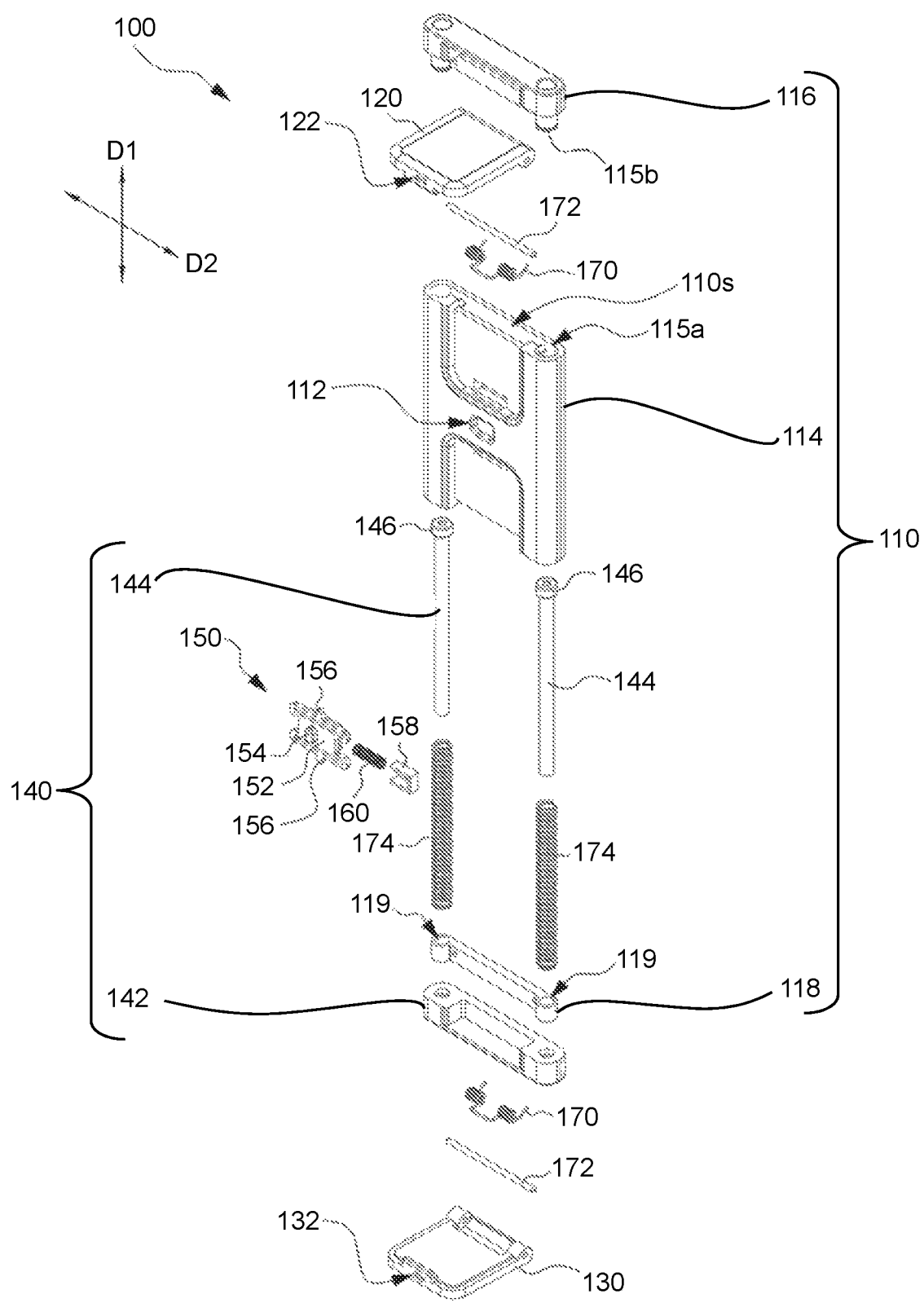
FIG. 1 is an exploded view of a clamping fixture according to one embodiment of the present invention.

FIG. 1 is an exploded view of a clamping fixture according to one embodiment of the present invention. Referring to FIG. 1, the clamping fixture 100 includes a body 110, a first clasp 130, a connector 140, a lock 150 and at least one first elastic member 174. The body 110 includes a housing 114, a first fixer 118 and a second fixer 116. The first fixer 118 and the second fixer 116 may be respectively disposed on two sides of the housing 114. In one embodiment, the first fixer 118 may be firmly disposed on the housing 114 by screwing. The housing 114 has a first positioning portion 115a, and the second fixer 116 has a second positioning portion 115b. The first positioning portion 115a and the second positioning portion 115b may be coupled, so that the second fixer 116 is assembled to the housing 114. In one embodiment, the first positioning portion 115a and the second positioning portion 115b may respectively be a slot and a bump. However, the present invention is not limited to the manner in which the first fixer 118 or the second fixer 116 is combined with the housing 114.

The connector 140 may be disposed on the body 110 in a relatively linearly movable manner, and may be movable relative to the body 110 along the first direction D1 to be retracted in or be pulled out of the body 110. When the connector 140 is pulled out of the body 110, the total length of the connector 140 and the body 110 along the first direction D1 is elongated. The connector 140 includes a fixing member 142 and at least one rod 144. One end of the rod 144 is connected to the fixing member 142, and the other end of the rod 144 has a protrusion 146. The body 110 has an accommodation space 110s. In one embodiment, the accommodation space 110s is formed in the housing 114. At least a portion of the connector 140 is located in the accommodation space 110s. Specifically, the body 110 has at least one channel 119 on one side (e.g., the first fixer 118). The rod 144 passes through the channel 119 of the first fixer 118 to be connected to the fixing member 142. The outer diameter of the protrusion 146 is substantially larger than the inner diameter of the channel 119. The protrusion 146 is located in the accommodation space 110s. The fixing member 142 and the first fixer 118 may be detachably combined with each other. When the connector 140 is retracted in the body 110, for example when the connector 140 is relatively retracted in the body 110, the fixing member 142 and the first fixer 118 are combined with each other. When the connector 140 is pulled out of the body 110, the fixing member 142 and the first fixer 118 are detached from each other. In the present embodiment, the connector 140 includes two rods 144, and the first fixer of the body 110 has two channels 119.

The at least one first elastic member 174 applied force to the connector 140 and the body 110 along the first direction D1 In the present embodiment, the first elastic member 174 is disposed on the connector 140, and one end of the first elastic member 174 is connected to the body 110. In the present embodiment, the number of the at least one first elastic member 174 is two. Each rod 144 respectively passes through one first elastic member 174 located between the protrusion 146 of the rod 144 and one side of the body 110 (e.g., the first fixer 118). The outer diameter of the protrusion 146 is substantially larger than the inner diameter of the first elastic member 174, and the outer diameter of the first elastic member 174 is substantially larger than the inner diameter of the channel 119. Therefore, the first elastic member 174 may be located in the accommodation space 110s, and be restricted between the protrusion 146 and the first fixer 118.

In one embodiment, two ends of each first elastic member 174 may respectively be fixed to the protrusion 146 and the first fixer 118. However, in another embodiment, the two ends of each first elastic member 174 may not be fixed to the protrusion 146 and the first fixer 118. In other embodiments, the two ends of the first elastic member 174 may respectively be connected to the connector 140 and the body 110 as well. For example, the two ends of the first elastic member 174 are respectively connected between the protrusion 146 of the connector 140 and the other side of the body 110 (e.g., the second fixer 116).

The first clasp 130 includes a first fastener 132. The first clasp 130 is disposed on one end of the connector 140. In one embodiment, the first clasp 130 is disposed on the fixing member 142 of the connector 140 through a rotating shaft 172. In another embodiment, the first clasp 130 may be disposed on one end of the connector 140 through a hinge (not illustrated) as well. In another embodiment the clamping fixture 100 may also include a second elastic member 170. Two ends of the second elastic member 170 are respectively connected to the first clasp 130 and the connector 140. The first clasp 130 is rotatable relative to the connector 140 by the rotating shaft 172, the hinge or the second elastic member 170. In the present embodiment, the clamping fixture 100 may further include a second clasp 120 and another second elastic member 170. The second clasp 120 includes a first fastener 122. The second clasp 120 is disposed on the second fixer 116 of the body 110 through another rotating shaft 172 or a hinge, and another rotating shaft 172 is pivotally connected to the body 110 and the second clasp 120.

The lock 150 includes a second fastener 156. The first clasp 130 and the lock 150 are coupled through the first fastener 132 and the second fastener 156. In the present embodiment, the lock 150 further includes a sliding block 152, and the second fastener 156 is disposed on one side of the sliding block 152. The sliding block 152 is movable relative to the body 110 along a second direction D2. In one embodiment, the first direction D1 is substantially perpendicular to the second direction D2. In one embodiment, the lock 150 further includes a button 154 disposed on the sliding block 152. The second fastener 156 and the button 154 may be firmly disposed on the sliding block 152, such that the sliding block 152, the button 154 and the second fastener 156 may move in conjunction with each other, thereby moving along the same direction at the same time. In the present embodiment, the lock 150 further includes another second fastener 156, and the second clasp 120 and the lock 150 are coupled through the first fastener 122 and another second fastener 156. At least a portion of the lock 150 is located in the accommodation space 110s of the body 110. The button 154 is exposed outside the body 110 from an opening 112 of the housing 114. In one embodiment, the lock 150 further includes a third elastic member 160. The third elastic member 160 applies force to the body 110 and the lock 150 along the second direction D2 (a further illustration of the lock 150 will be described in the following FIGS. 6-9).

Figure 3:
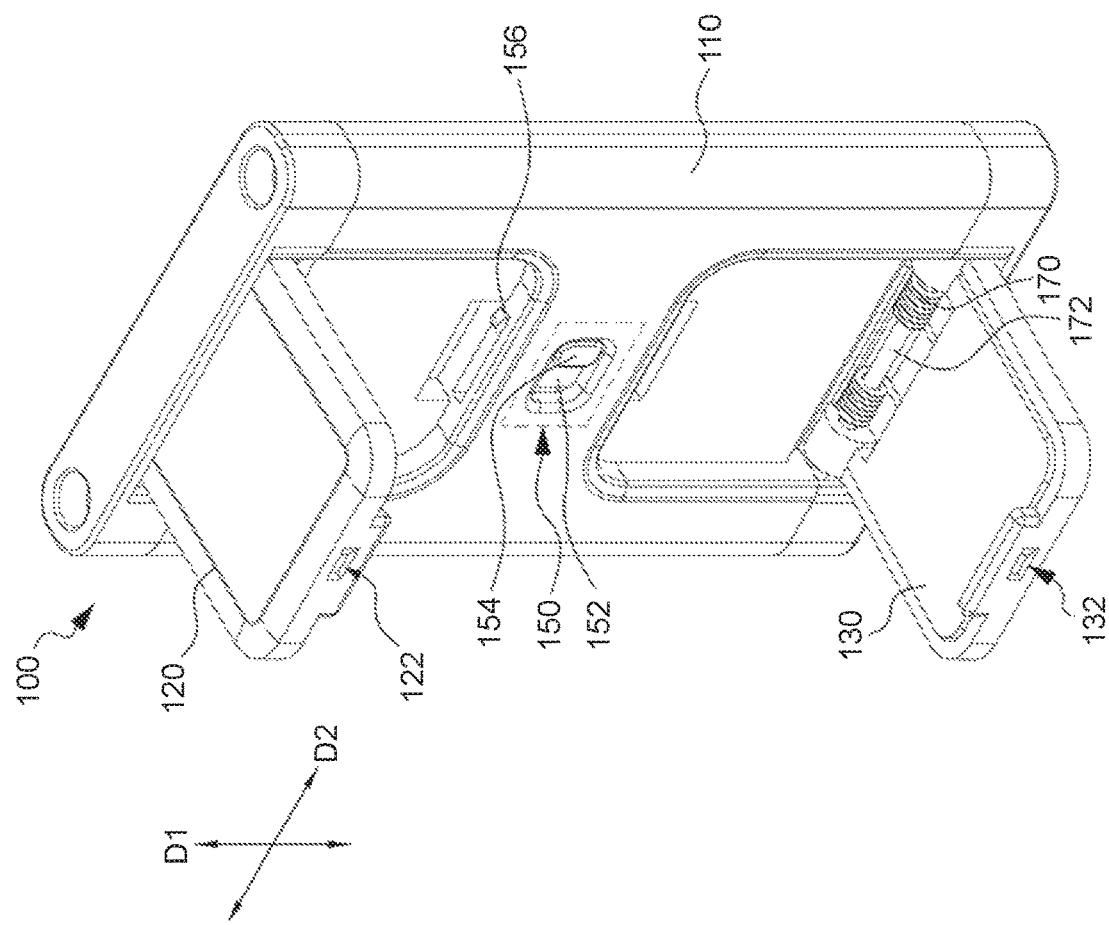
FIGS. 2-5 are schematic views respectively showing the clamping fixture of FIG. 1 at different stages for use.
Figure 2:
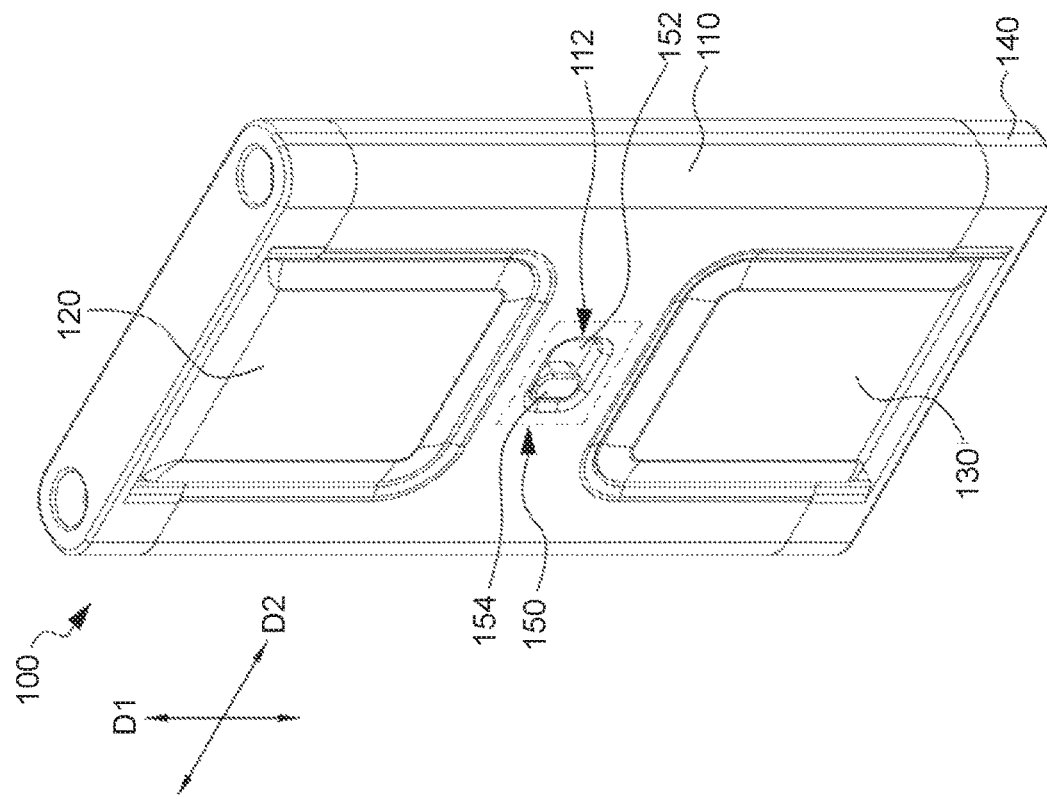

FIGS. 2-5 are schematic views respectively showing the clamping fixture of FIG. 1 at different stages for use. As shown in FIG. 2, when the first fasteners 132, 122 are respectively coupled to the second fasteners 156, the first clasp 130 and the second clasp 120 are respectively coupled to the lock 150. Therefore, the first clasp 130 and the second clasp 120 are retracted on the body 110; that is, the clamping fixture 100 is in a storage state. As shown in FIG. 3, when the first fasteners 132, 122 are respectively detached from the second fasteners 156, the first clasp 130 and the second clasp 120 are respectively detached from the lock 150; that is, the clamping fixture 100 is released from the storage state.

In more detail, the two second fasteners 156 of the lock 150 respectively extend towards the first clasp 130 and the second clasp 120. The first fastener 132 of the first clasp 130 corresponds to one second fastener 156, and the first fastener 122 of the second clasp 120 corresponds to another second fastener 156. The sliding block 152 moves between an initial position (as shown in FIG. 2) and an abutting position (as shown in FIG. 3) along the second direction D2. When the clamping fixture 100 is in the storage state (as shown in FIG. 2), the first fasteners 132, 122 are coupled to the second fasteners 156, and the sliding block 152 is located at the initial position. When the sliding block 152 moves to the abutting position as shown in FIG. 3, the second fasteners 156 are detached from the first fasteners 132, 122.

Referring to FIG. 3, in one embodiment, the second elastic member 170 may be a torsion spring. The rotating shaft 172 passes through the second elastic member 170. One second elastic member 170 is pivotally connected to the connector 140 and the first clasp 130, and another second elastic member 170 is pivotally connected to the body 110 and the second clasp 120. When the first clasp 130 or the second clasp 120 rotates along a direction approaching the connector 140 or the body 110, the second elastic member may provide a restoring force. For example, when the first fastener 132 is coupled to the second fastener 156, the first clasp 130 and the connector 140 apply force to the second elastic member 170, such that the second elastic member 170 provides the restoring force. When the first fastener 132 is detached from the second fastener 156, the restoring force provided by the second elastic member 170 applies force respectively to the first clasp 130 and the connector 140, such that the first clasp 130 automatically rotates towards a plane. The above-mentioned plane may be substantially perpendicular to the first direction D1. Similarly, when the first fastener 122 is coupled to the second fastener 156, the second clasp 120 and the body 110 apply force to the second elastic member 170, such that the second elastic member 170 provides a restoring force. When the first fastener 122 is detached from the second fastener 156, the restoring force provided by the second elastic member 170 applies force respectively to the second clasp 120 and the body 110, such that the second clasp 120 automatically rotates towards the plane substantially perpendicular to the first direction D1.

Figure 5:
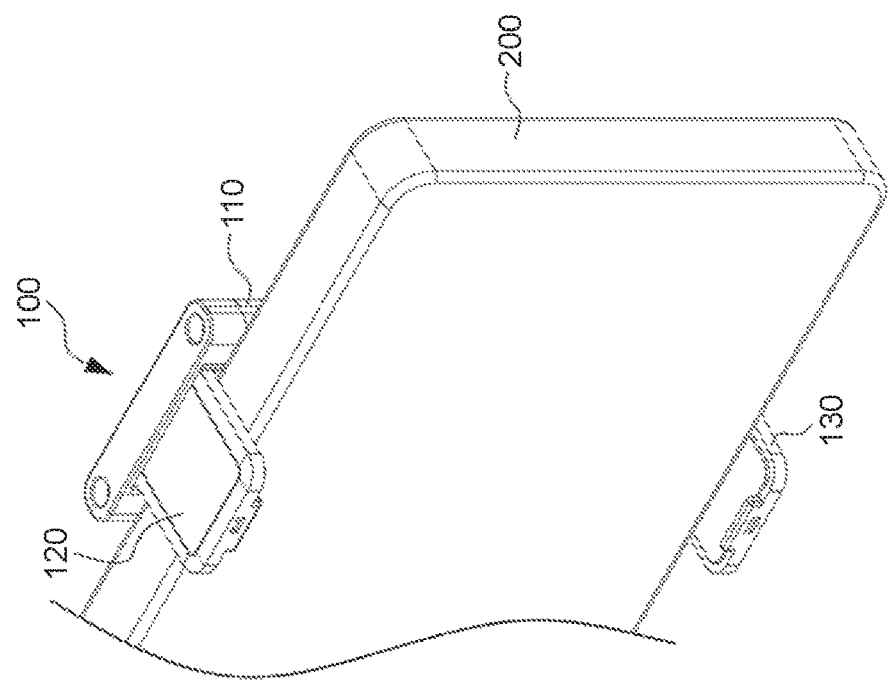
Figure 4:
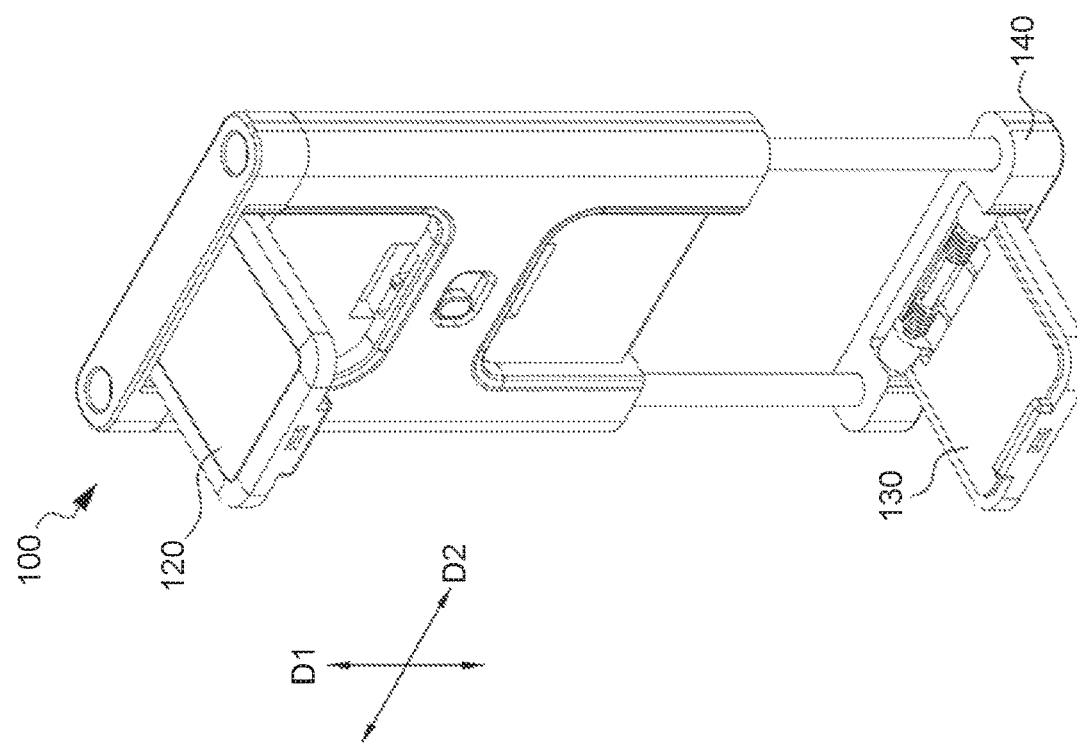

Referring to FIG. 4, when the first fastener 132 is detached from the second fastener 156, the connector 140 is movable relative to the body 110 along the first direction D1. The connector 140 may move along the first direction D1 to adjust the distance between the first clasp 130 and the second clasp 120. Referring to FIG. 5, an article 200 may be placed or held between the first clasp 130 and the second clasp 120. The article 200 may be a portable electronic device or a hand-held electronic device, such as a mobile phone, a tablet, a camera, or a video camera, but the invention is not limited thereto. Furthermore, the clamping fixture 100 and the article 200 may further constitute an electronic system.

The clamping fixture 100 is configured to at least place or hold the article 200. In one embodiment, an expansion kit, such as a lens, a wireless module, a control module, a battery charging module, etc., may be disposed on the clamping fixture 100. The expansion kit may be electrically connected to the article 200 through a wire, a port or a wireless module. Furthermore, the clamping fixture 100 may be combined with other components to form a selfie stick. In addition, the clamping fixture 100 may further be firmly disposed on an object. The above examples are merely exemplary and are not intended to limit the scope of the present invention, and those skilled in the art may vary according to actual needs.

Returning to FIG. 1, the first elastic member 174 applies force to the connector 140 and the body 110 along the first direction. When there is an external force applying to the connector 140, the connector 140 may be pulled out of the body 110 along the first direction D1, and the connector 140 and the body 110 apply force to the first elastic member 174, such that the first elastic member 174 provides a restoring force. When the external force is released, the connector 140 is retracted towards the body 110 along the first direction D1 through the restoring force provided by the first elastic member 174. The article 200 may therefore be held among the body 110, the first clasp 130 and the second clasp 120.

FIGS. 6-9 are schematic views respectively showing the lock of FIG. 1 at different stages for operation. It should be noted that in order to make the drawings clear, part of the body 110 is hidden in the drawings.

Figure 6:
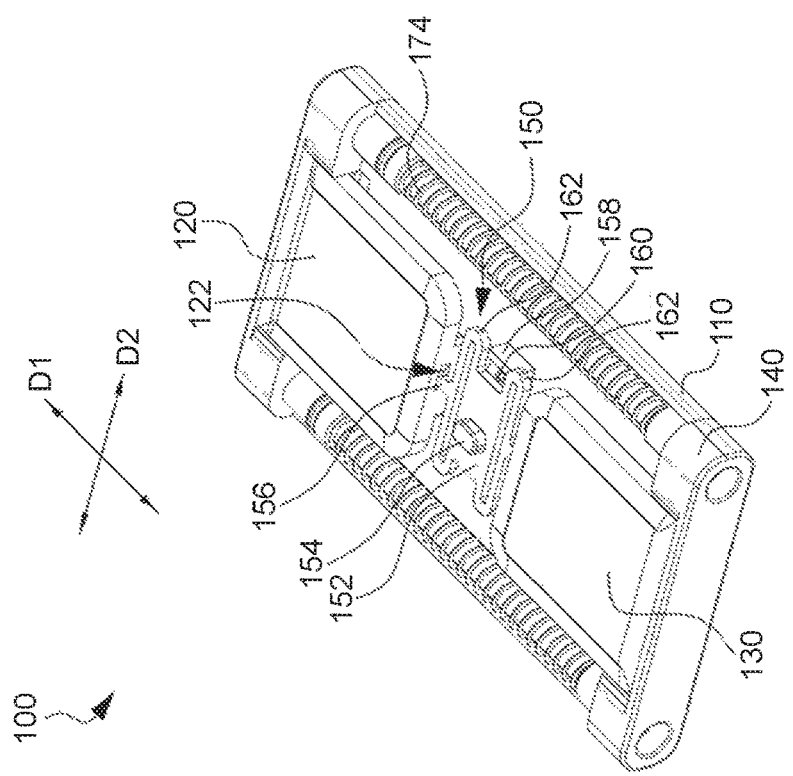

Referring to FIG. 1 and FIG. 6, in the present embodiment, the lock 150 includes two second fasteners 156, a sliding block 152, a button 154 and a third elastic member 160. The sliding block 152 is made of elastic material, such as plastic and metal. In one embodiment, the sliding block 152 of the lock 150 has two elastic arms 162 integrally formed on two sides of the sliding block 152. The two second fasteners 156 are respectively disposed on the two elastic arms 162, and the button 154 is located between the two elastic arms 162.

Figure 7:
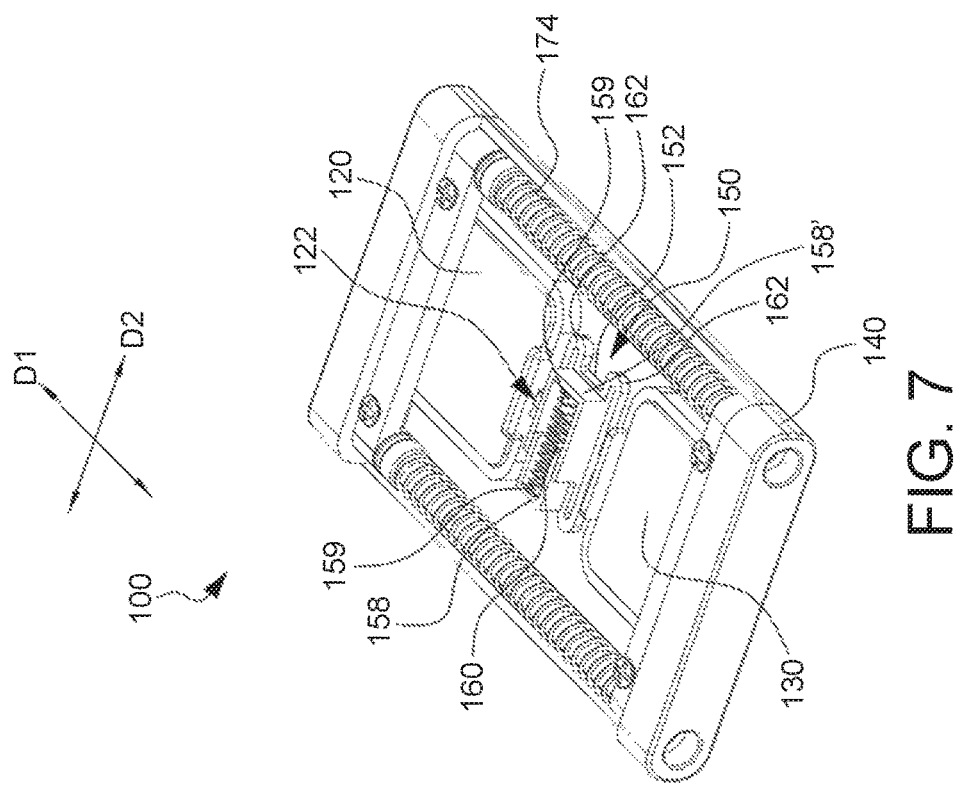
FIGS. 6-9 are schematic views respectively showing the lock of FIG. 1 at different stages for operation.

Referring to FIG. 7, the third elastic member 160 is located between the sliding block 152 and the body 110, and applies force to the sliding block 152 and the body 110 along the second direction D2. In one embodiment, the sliding block 152 has a fixing base 158', and the body 110 has a stopping portion 158. One end of the third elastic member 160 abuts against the fixing base 158', and the other end of the third elastic member 160 abuts against the stopping portion 158. The fixing base 158' is fixed to the sliding block 152. The stopping portion 158 is fixed to the body 110. Therefore, when the sliding block 152 moves relative to the body 110, the fixing base 158' may move together with the sliding block 152 relative to the stopping portion 158, such that the third elastic member 160 is deformed by force. In the present embodiment, the third elastic member 160 may be a compression spring. In other embodiments, the third elastic member 160 may be a rubber post or the like that can be restored to its original shape after being deformed by force. The sliding block 152 may be moved by an external force applied to the sliding block 152 or the button 154. When the sliding block 152 is moved from the initial position to the abutting position along the second direction D2 by the external force, the third elastic member 160 is compressed by the fixing base 158' of the sliding block 152 and the stopping portion 158 of the body 110 and thus provides a restoring force. When the external force is released, the sliding block 152 may return back to the initial position along the second direction D2 by the restoring force provided by the third elastic member 160.

In one embodiment the fixing base 158' and the stopping portion 158 respectively may further include a post 159. The post 159 may be directly connected to the fixing base 158' or the stopping portion 158. The posts 159 my respectively extend into two ends of the third elastic member 160. It is to be noted that the shapes of the fixing base 158', the stopping portion 158 and the post 159 in the present embodiment are merely exemplary, but the invention is not limited thereto.

Figure 8:
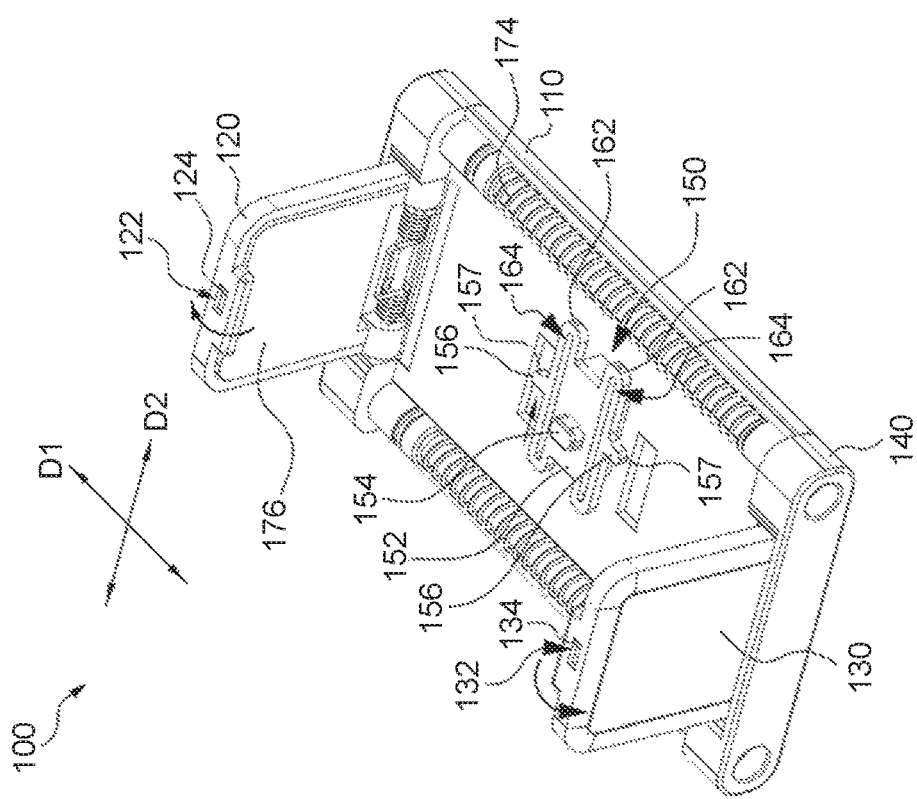

In one embodiment, the first fasteners 132, 122 and the second fasteners 156 may respectively be recesses and hooks corresponding to each other. Referring to FIG. 6 and FIG. 8, the first fasteners 132, 122 are respectively disposed on one side of the first clasp 130 and one side of the second clasp 120. When the clamping fixture 100 is released from the storage state (as shown in FIG. 8), in a condition that an external force applies force to the first clasp 130 (or the second clasp 120), the first clasp 130 (or the second clasp 120) is rotatable relative to the connector 140 (or the body 110), such that the side of the first clasp 130 (or the second clasp 120) on which the first fastener 132 (or the first fastener 122) is disposed approaches the connector 140 (or the body 110). When the side of the first clasp 130 (or the second clasp 120) on which the first fastener 132 (or the first fastener 122) is disposed continues to approach the connector 140 (or the body 110) so as to press the second fastener 156, the elastic arm 162 of the sliding block 152 is deformed by force. Therefore, the second fastener 156 may slightly move towards the center of the sliding block 152, and extend into the first fastener 132 (or the first fastener 122) along the side of the first clasp 130 (or the second clasp 120) on which the first fastener 132 (or the first fastener 122) is disposed. In one embodiment, the surface of the side of the first clasp 130 (or the second clasp 120) on which the first fastener 132 (or the first fastener 122) is disposed may include a slope, a curved surface, a rounded surface and so on, such that the first fastener 132 (or the first fastener 122) may be coupled to the second fastener 156 smoothly. In another embodiment, the hooks and the recesses may be interchangeable.

For example, the second fasteners 156 may be recesses, and the first fasteners 132, 122 may be hooks corresponding to the recesses.

When the sliding block 152 moves along a direction, the second fastener 156 may be moved along the direction. Referring to FIG. 6 and FIG. 8, when the sliding block 152 moves to the abutting position, the first clasp 130 and the second clasp 120 may be detached from the lock 150 by the sliding block 152. Specifically, when the sliding block 152 moves to the abutting position, the second fasteners 156 contact with the side walls of the first fasteners 132, 122 (the side walls on the right side as shown in the figure). The second fasteners 156 may have an interference with the side walls of the first fasteners 132, 122, such that the second fasteners 156 are pressed and the elastic arms 162 are therefore deformed by force. As a result, the second fasteners 156 slightly move towards the center of the sliding block 152 to be detached from the first fasteners 132, 122.

In order to increase the amount of deformation of the elastic arm 162 when the elastic arm 162 is pressed, a closed or open slot 164 may be optionally provided on the elastic arm 162. When the second fasteners 156 have an interference with the side walls of the first fasteners 132, 122, the elastic arms 162 may be deformed more easily by the slot 164, such that the second fasteners 156 are detached from the first fasteners 132, 122. Referring to FIG. 8, in order to allow the first fasteners 132, 122 to be detached from the second fasteners 156 smoothly, the shapes of the first fasteners 132, 122 may match the shapes of the second fasteners 156. In the present embodiment, the first fasteners 132, 122 are recesses, and the side walls of the first fasteners 132, 122 have slopes 134, 124. The second fasteners 156 are hooks and have chamfers 157. When the second fasteners 156 have an interference with the side walls of the first fasteners 132, 122, the slopes 134, 124 may guide the chamfers 157, such that the second fasteners 156 are detached from the first fasteners 132, 122 smoothly. When the first fasteners 132, 122 are detached from the second fasteners 156, the first clasp 130 and the second clasp 120 may be opened outwards automatically by the restoring force provided by the second elastic members 170. When the external force applied to the sliding block 152 is released, the sliding block 152 are pushed back to the initial position by the restoring force provided by the third elastic member 160.

Figure 9:
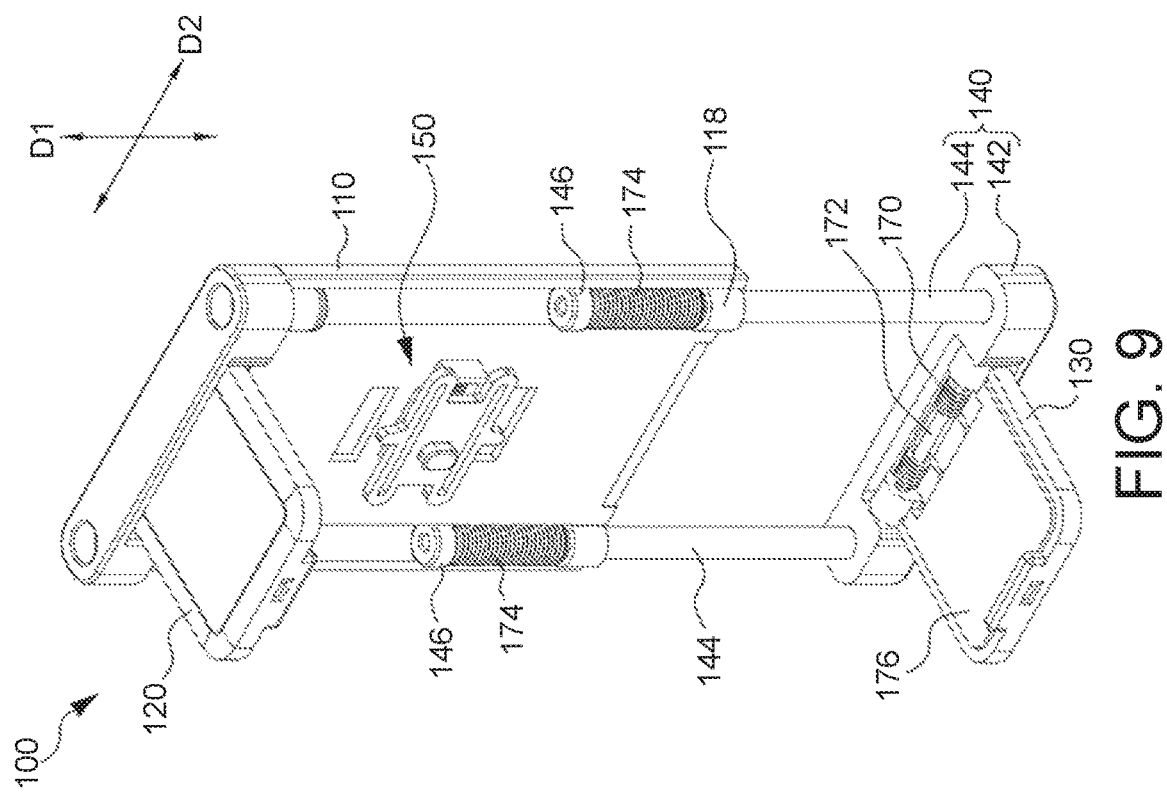

Referring to FIG. 9, the first elastic member 174 is restricted between the protrusion 146 of the rod 144 and the first fixer 118. When the connector 140 is moved along the first direction D1 by the external force and pulled out of the body 110, the first elastic member 174 is compressed and provides a restoring force. When the external force is released, the connector 140 is retracted back by the restoring force provided by the first elastic member 174.

In one embodiment, the first clasp 130 and the second clasp 120 are respectively provided with a cushion 176. The cushion 176 is preferably made of soft material, such as rubber and foam, to build up a cushion when the first clasp 130 and the second clasp 120 hold the article, preventing the surface of the article from being rubbed or damaged by collision. In some embodiments, the surface of the cushion 176 may be provided with engraving marks to reduce the possibility that the article might slip.

It is to be noted that, in the above embodiment, the first clasp 130 is disposed at one end of the connector 140, and the second clasp 120 is disposed at one end of the body 110. However, in other embodiments, the first clasp 130 may also be disposed at one end of the body 110, and the second clasp 120 is disposed at one end of the connector 140.

The principle of how to use the clamping fixture 100 and the operation principle of the lock 150 have been described in conjunction with the drawings and the embodiments set forth. Therefore, in the following embodiments, different aspects of the connector will be mainly described, and some that are the same as the previous embodiments will not be repeated here.

Figure 10:
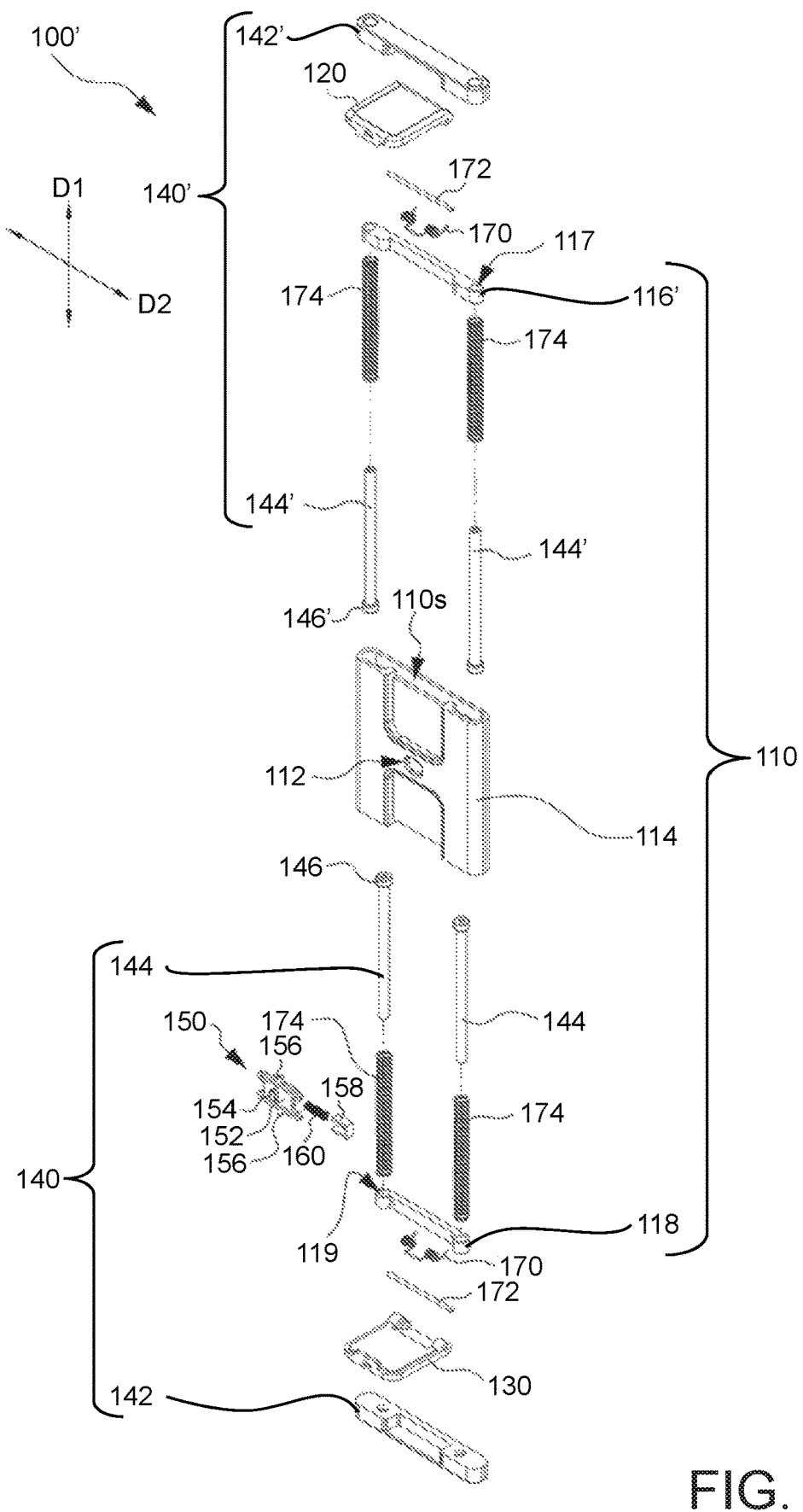
FIG. 10 is an exploded view of a clamping fixture according to another embodiment of the present invention.
Figure 11:
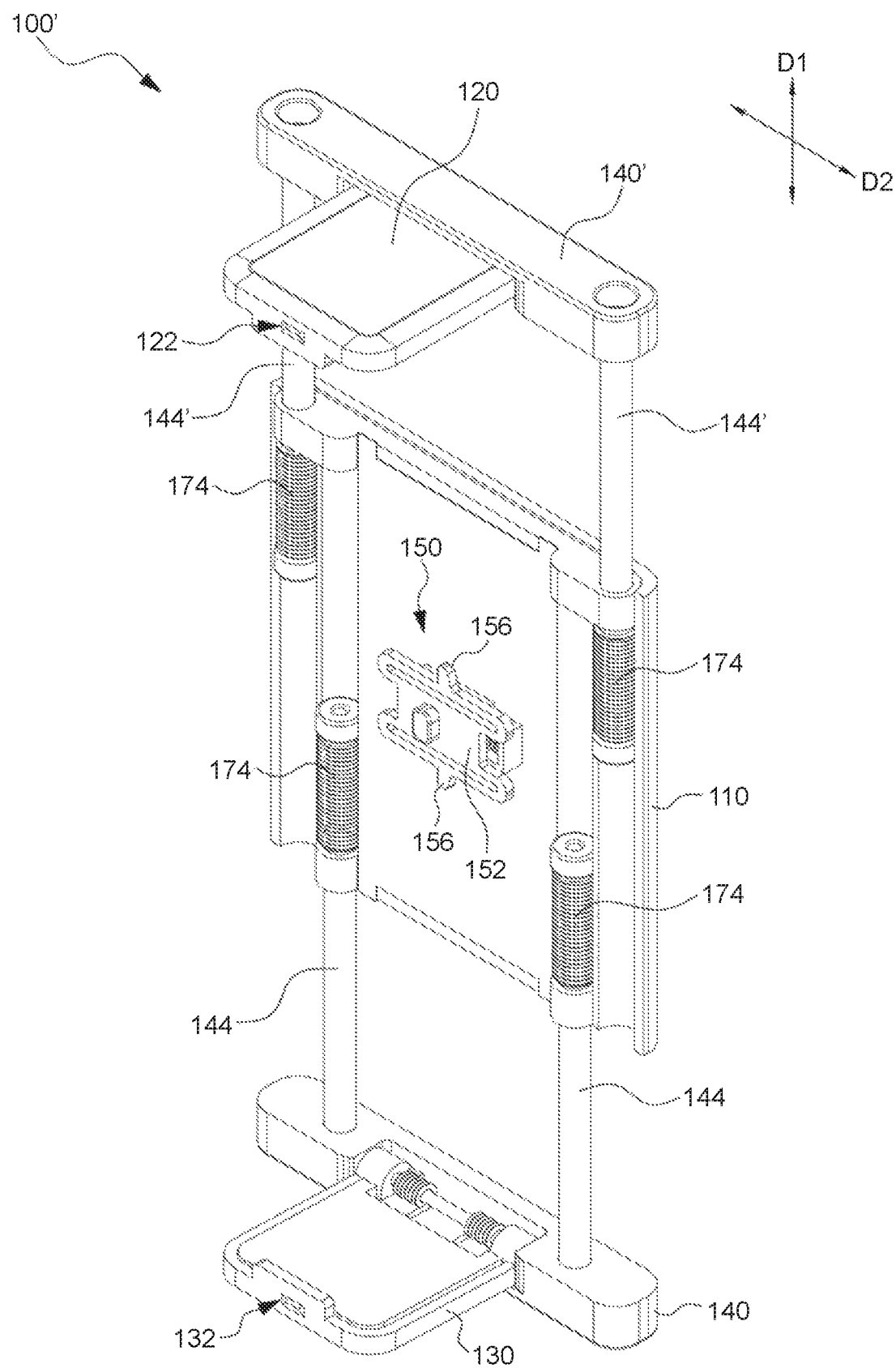
FIG. 11 is a schematic view showing the clamping fixture of FIG. 10 at one stage for use.

FIG. 10 is an exploded view of a clamping fixture according to another embodiment of the present invention. FIG. 11 is a schematic view showing the clamping fixture of FIG. 10 at one stage for use. The clamping fixture 100' of FIG. 10 is approximately the same as the clamping fixture 100 of FIG. 1, and identical reference numerals denote similar or identical components.

Referring to FIG. 10, the clamping fixture 100' includes a body 110, a first clasp 130, a second clasp 120, two connectors 140, 140', a lock 150 and a plurality of first elastic members 174. The two connectors 140, 140' are respectively disposed on the body 110, and may move relative to the body 110 along the first direction D1. The first clasp 130 is disposed on one end of the connector 140 through a second elastic member 170 and a rotating shaft 172, and the second clasp 120 is disposed on the connector 140' through another second elastic member 170 and another rotating shaft 172. The body 110 includes a housing 114, a first fixer 118 and a second fixer 116'. The first fixer 118 and the second fixer 116' are disposed on two sides of the body 110. In the present embodiment, the first fixer 118 and the second fixer 116' may fixed to the housing 114 respectively by screwing, but the present embodiment is not limited thereto. The connector 140, the lock 150 and the first fixer 118 have been described in conjunction with the embodiments set forth, and it will not be repeated here. The following mainly describes the connector 140' and the second fixer 116'.

In the present embodiment, the structure of the connector 140' is similar or identical with the structure of the connector 140. The connector 140' includes a fixing member 142' and two rods 144'. One end of each rod 144' is connected to the fixing member 142', and the other end of each rod 144' has a protrusion 146'. At least a portion of the connector 140' is located in the accommodation space 110s. Specifically, the second fixer 116' has two channels 117. The rods 144' pass through the channels 117 of the second fixer 116' to be connected to the fixing member 142'. The outer diameter of the protrusion 146' is substantially larger than the inner diameter of the channel 117. The protrusion 146' is located in the accommodation space 110s. The fixing member 142' and the second fixer 116' may be detachably combined with each other. When the connector 140' is retracted in the body 110, the fixing member 142' and the second fixer 116' are combined with each other. When the connector 140' is pulled out of the body 110, the fixing member 142' and the second fixer 116' are detached from each other.

In the present embodiment, the number of the plurality of first elastic members 174 is four. Each rod 144, 144' respectively passes through one first elastic member 174 located between the protrusion 146' and the second fixer 116'. The outer diameter of the protrusion 146' is substantially larger than the inner diameter of the first elastic member 174, and the outer diameter of the first elastic member 174 is substantially larger than the inner diameter of the channel 117. Therefore, the first elastic member 174 may be located in the accommodation space 110s of the body 110, and be restricted between the protrusion 146' and the second fixer 116'.

The operation of the clamping fixture 100' from the storage state to the state released from the storage state is substantially the same as the operation of the clamping fixture 100. When the clamping fixture 100' is in the storage state, the sliding block 152 of the lock 150 moves along the second direction D2, such that the first fasteners 132, 122 are detached from the second fasteners 156. That is, the first clasp 130 and the second clasp 120 are respectively detached from the lock 150. The first clasp 130 and the second clasp 120 may respectively rotate relative to the connectors 140, 140', and are opened outwards; that is, the clamping fixture 100' is released from the storage state. Furthermore, referring to FIG. 11, when the first clasp 130 and the second clasp 120 are respectively detached from the lock 150, the connectors 140, 140' are respectively movable relative to the body 110. For example, when the connectors 140, 140' may be pulled out of the body 110 along the first direction D1 by force, the distance between the connectors 140, 140' will gradually increase. When the external force is released, the connectors 140, 140' may return back towards the body 110 by the restoring force provided by the first elastic member 174.

In the present embodiment, the first elastic members 174 are respectively disposed on the two connectors 140, 140' of the clamping fixture 100'. However, in other embodiments, the first elastic members 174 may also be disposed on only one of the connectors.

In a comparison between the clamping fixture 100 using a single connector 140 and the clamping fixture 100' using two connectors 140, 140', when the largest distances between the first clasp 130 and the second clasp 120 are the same, the stroke of the single connector 140 of the clamping fixture 100 may be larger than the respective stroke of the two connectors 140, 140' of the clamping fixture 100'. Therefore, the volume of the clamping fixture 100' may be further reduced as compared with the volume of the clamping fixture 100.

Figure 12:
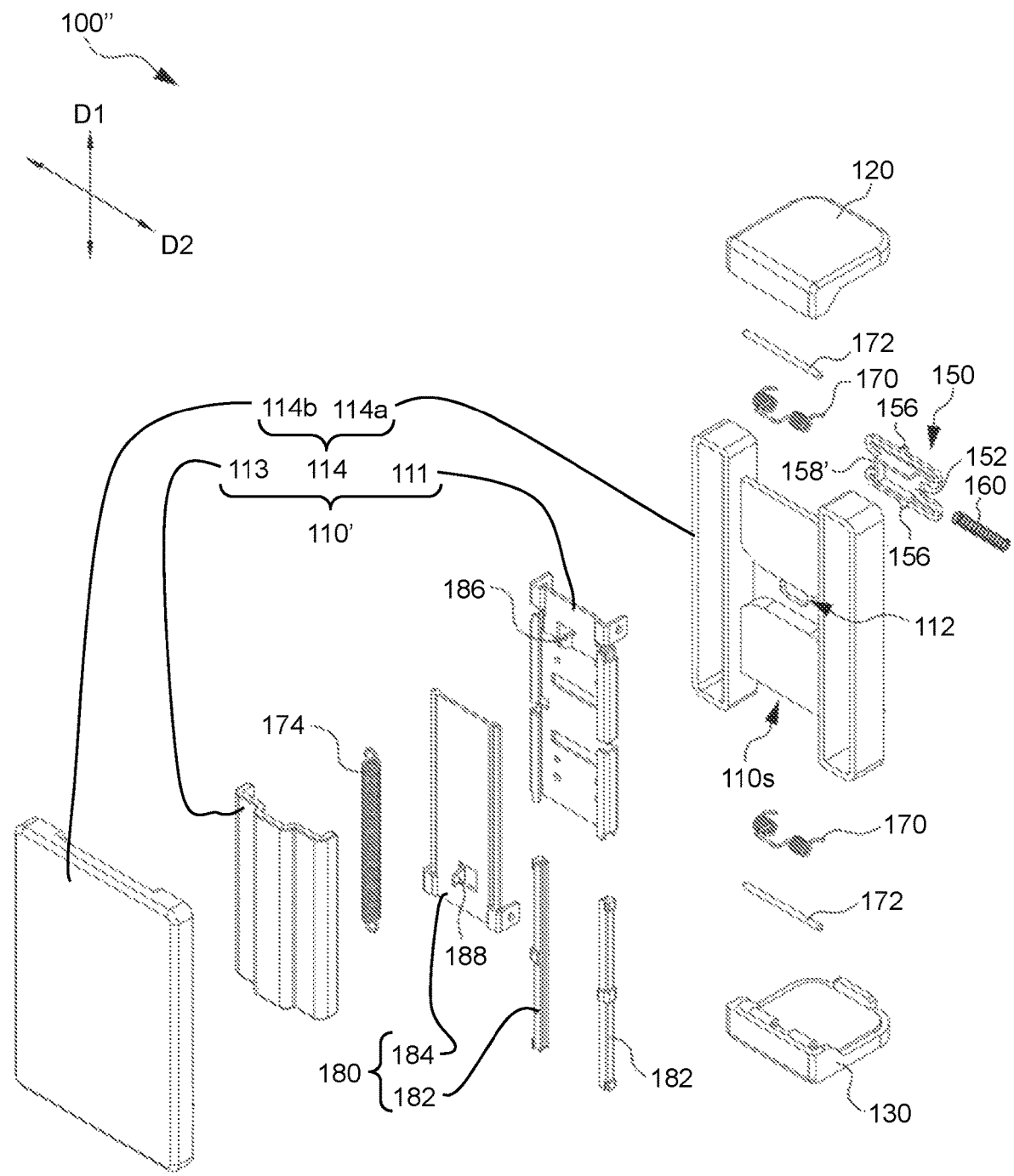
FIG. 12 is an exploded view of a clamping fixture according to still another embodiment of the present invention.
Figure 14:
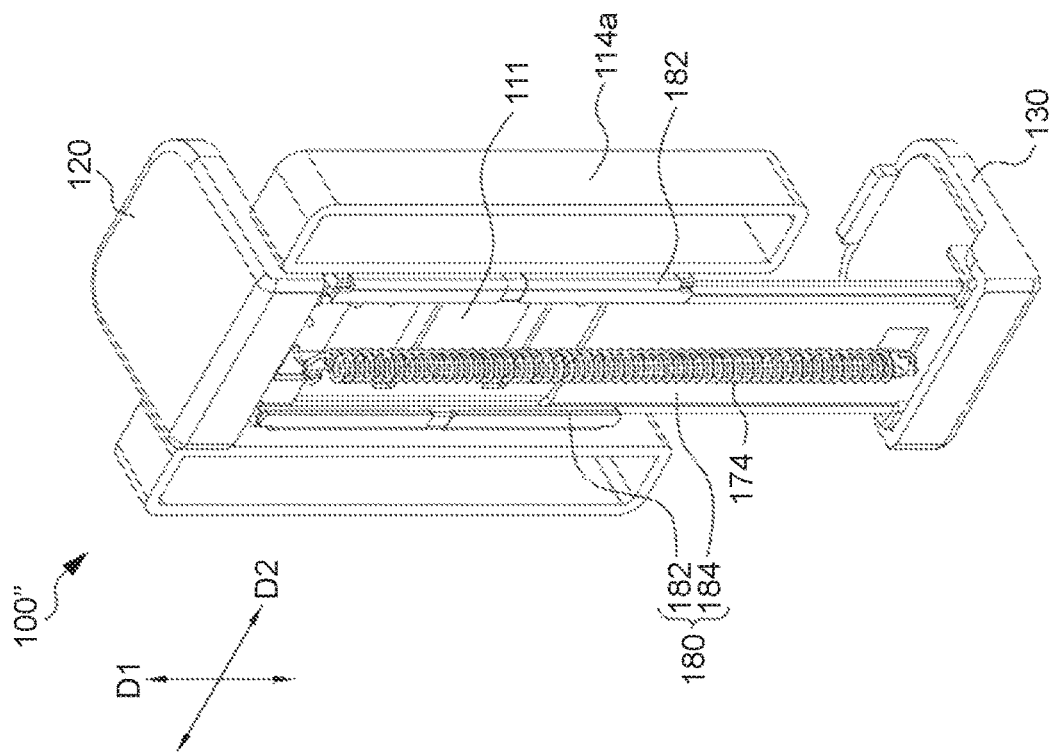
FIGS. 13-14 are schematic views respectively showing the clamping fixture of FIG. 12 at different stages for use.
Figure 13:
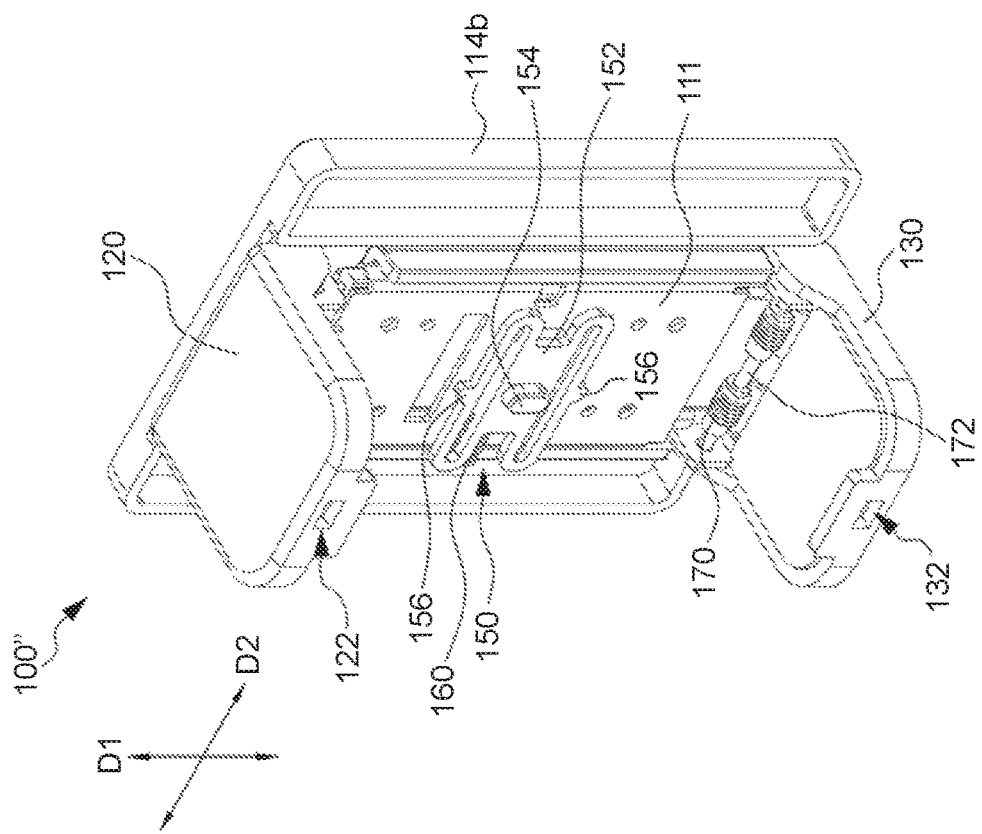

FIG. 12 is an exploded view of a clamping fixture according to still another embodiment of the present invention. FIGS. 13-14 are schematic views respectively showing the clamping fixture of FIG. 12 at different stages for use. In the embodiments of FIG. 1 FIG. 10 and FIG. 12, identical reference numerals denote similar or identical components. Furthermore, FIG. 12 and FIG. 14 are rear views, and FIG. 13 is front view.

Referring to FIG. 12, the clamping fixture 100" includes a body 110', a first clasp 130, a second clasp 120, a connector 180, a lock 150 and a first elastic member 174. The body 110' includes a housing 114 and a base 111 fixed to the housing 114. The base 111 may be fixed to the housing 114 by adhesive or screw, but the present invention is not limited thereto. In the present embodiment, the housing 114 may consist of an upper housing 114a and a bottom housing 114b. The accommodation space 110s is formed between the upper housing 114a and the bottom housing 114b. The base 111 is located in the accommodation space 110s. The opening 112 is formed in the upper housing 114a.

The lock 150 is disposed on the base 111. The sliding block 152 is movable relative to the base 111 along the second direction D2, and the button 154 is exposed from the opening 112. In the present embodiment, one end of the third elastic member 160 is connected to the sliding block 152 by the fixing base 158', and the other end of the third elastic member 160 is connected to the body 110'. That is, the stopping portion 158 in FIG. 7 may also be an existing structure of the body 110. Furthermore, the fixing base 158' may be disposed at different position of the sliding block 152 according to actual needs, as shown in FIG. 7 and FIG. 12. Thus, the third elastic member 160 may provide restoring forces in different directions in conjunction with the positions of the slopes 134, 124 of the first fasteners 132, 122 and the chamfers 157 of the second fasteners 156.

The connector 180 includes a sliding rail assembly 182 and a sliding member 184. The sliding rail assembly 182 is disposed on the body 110'. For example, the sliding rail assembly 182 is fixed to the base 111 of the body 110'. The sliding member 184 is assembled to the sliding rail assembly 182, and may move relative to the sliding rail assembly 182 along the first direction D1. By the sliding rail assembly 182 and the sliding member 184, the connector 180 and the body 110' is relatively movable along the first direction D1. The two ends of the first elastic member 174 are respectively connected to the base 111 of the body 110' and the sliding member 184 of the connector 180. In the present embodiment, the base 111 has a first fixing end 186, and the sliding member 184 has a second fixing end 188. The two ends of the first elastic member 174 are respectively disposed on the first fixing end 186 and the second fixing end 188. The first fixing end 186 and the second fixing end 188 may respectively be a peg or a hook, but the present invention is not limited thereto. The first elastic member 174 may be a tension spring. In one embodiment, the body 110' may further include a cover 113 covering the first elastic member 174 and the sliding member 184.

The first clasp 130 is disposed on the connector 180, and the second clasp 120 is disposed on the body 110'. Specifically, the first clasp 130 is disposed on the sliding member 184 of the connector 180 through a second elastic member 170 and a rotating shaft 172, and the second clasp 120 is disposed on the base 111 of the body 110' through another second elastic member 170 and another rotating shaft 172. Referring to FIG. 13, when the sliding block 152 moves to the abutting portion along the second direction D2, the first fasteners 132, 122 are detached from the second fasteners 156, and the first clasp 130 and the second clasps 120 are rotated and opened outwards by the second elastic members 170.

Referring to FIG. 12 and FIG. 14, when there is an external force applied to the sliding member 184, the sliding member 184 may slide relative to the sliding rail assembly 182 along the first direction D1 to be pulled out of the body 110'. That is, the connector 180 and the body 110' are elongated along the first direction D1, and the first clasp 130 may be away from the body 110' along with the sliding member 184. At this time, the first elastic member 174 is deformed by force, and thus provides a restoring force. When the external force is released, the sliding member 184 may be retracted in the body 110' by the restoring force provided by the first elastic member 174, and the first clasp 130 approaches the body 110' along with the sliding member 184.

In summary, the present invention provides a clamping fixture which is light in weight, good in reliability and easy to operate. The clasp of the clamping fixture may be retracted by the lock of the clamping fixture. The sliding block of the lock may be displaced by an external force, such that the clasp is detached from the lock. In addition, the clasp may be pulled out through the connector of the clamping fixture to hold or place an article. Furthermore, the distance between the two clasps may be adjusted by the connector. Thereby, the utility and convenience of the clamping fixture may be improved.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. A clamping fixture comprising:
a body comprising a housing and a first fixer, and the first fixer disposed on the housing;
a connector comprising a rod, and the rod disposed on the first fixer;
a first clasp disposed on the connector and comprising a first fastener;
at least one first elastic member, and the rod disposed in the first elastic member; and
a lock comprising a sliding block slidable relative to the body and a second fastener on the sliding block, and the first clasp and the lock coupled through the first fastener and the second fastener.

2. The clamping fixture according to claim 1, wherein the connector further comprises a fixing member, and the first clasp is disposed on the fixing member.

3. The clamping fixture according to claim 1, wherein the first fixer has a channel, the rod comprises a protrusion at one end, the rod is linearly movable relative to the body along a first direction in the channel of the first fixer, and the first elastic member is disposed between the protrusion and the first fixer.

4. The clamping fixture according to claim 1, wherein the sliding block moves between an initial position and an abutting position along a second direction.

5. The clamping fixture according to claim 4, wherein when the sliding block is located at the abutting position, the first clasp and the lock are detached from each other by the first fastener and the second fastener.

6. The clamping fixture according to claim 4, wherein the lock further comprises a third elastic member disposed between the sliding block and the body.

7. The clamping fixture according to claim 4, wherein the lock further comprises a button disposed on the sliding block, and the button is exposed outside the body from an opening of the body.

8. A clamping fixture comprising:
a body comprising a first fixer;
a connector comprising a rod, the rod having a protrusion at one end;
at least one first elastic member, and the first elastic member disposed between the protrusion of the rod and the first fixer;
a first clasp pivotally connected to the connector and comprising a first fastener; and
a lock comprising a sliding block slidable relative to the body and a second fastener corresponding to the first fastener.

9. The clamping fixture according to claim 8, wherein the connector further comprises a fixing member, and the first clasp is pivotally connected to the fixing member.

10. The clamping fixture according to claim 8, wherein the first clasp and the lock are coupled through the first fastener and the second fastener.

11. A clamping fixture comprising:
a body;
a connector linearly movable relative to the body along a first direction;
a first clasp comprising a first fastener;
a lock comprising a sliding block slidable relative to the body and a second fastener disposed on the sliding block and corresponding to the first fastener;
at least one first elastic member disposed between the body and the connector; and
a second elastic member pivotally connected to the connector and the first clasp.

12. The clamping fixture according to claim 11, wherein the body comprises a first fixer, the connector comprises a rod, and the rod is disposed in the first elastic member.

13. The clamping fixture according to claim 11, wherein the connector comprises a fixing member, and the first clasp is pivotally connected to the fixing member.

14. The clamping fixture according to claim 11, wherein the connector comprises a sliding rail assembly and a sliding member, the sliding rail assembly is disposed on the body, the sliding member is disposed on the sliding rail assembly, and the first clasp is pivotally connected to the sliding member.

15. The clamping fixture according to claim 14, wherein the first elastic member is connected to the body and the sliding member.

16. The clamping fixture according to claim 11, further comprising a second clasp pivotally connected to the body.

17. The clamping fixture according to claim 11, wherein the sliding block moves between an initial position and an abutting position along a second direction.

18. The clamping fixture according to claim 17, wherein the lock further comprises a third elastic member, and the third elastic member is disposed between the sliding block and the body.

19. The clamping fixture according to claim 17, wherein the lock further comprises a button disposed on the sliding block, and the button is exposed outside the body from an opening of the body.

* * * * *